United States Patent
Enomoto et al.

(10) Patent No.: US 11,444,502 B2
(45) Date of Patent: Sep. 13, 2022

(54) COIL BOBBIN, STATOR CORE OF DISTRIBUTED WINDING RADIAL GAP-TYPE ROTATING ELECTRIC MACHINE, AND DISTRIBUTED WINDING RADIAL GAP-TYPE ROTATING ELECTRIC MACHINE

(71) Applicant: Hitachi High-Tech Corporation, Tokyo (JP)

(72) Inventors: Yuji Enomoto, Tokyo (JP); Seiji Okita, Tokyo (JP); Keisuke Suzuki, Tokyo (JP); Kohei Eto, Tokyo (JP); Eiji Katayama, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 178 days.

(21) Appl. No.: 17/098,787

(22) Filed: Nov. 16, 2020

(65) Prior Publication Data
US 2021/0249926 A1  Aug. 12, 2021

(30) Foreign Application Priority Data
Feb. 10, 2020  (JP) .............................. JP2020-020454

(51) Int. Cl.
*H02K 3/50* (2006.01)
*H02K 3/34* (2006.01)

(52) U.S. Cl.
CPC ................. *H02K 3/50* (2013.01); *H02K 3/34* (2013.01); *H02K 3/345* (2013.01); *H02K 2203/12* (2013.01)

(58) Field of Classification Search
CPC ............ H02K 3/34; H02K 3/345; H02K 3/50; H02K 2203/12
USPC .................................... 310/215, 216.105, 115
See application file for complete search history.

(56) References Cited

U.S. PATENT DOCUMENTS

| 2002/0074892 | A1* | 6/2002 | Lindbery | ............... | H02K 1/165 |
| | | | | | 310/216.004 |
| 2004/0207284 | A1* | 10/2004 | Neet | ....................... | H02K 3/48 |
| | | | | | 310/215 |
| 2011/0278973 | A1 | 11/2011 | Utaka et al. | | |
| 2014/0191629 | A1* | 7/2014 | Takahashi | ............. | H02K 11/25 |
| | | | | | 310/680 |

(Continued)

FOREIGN PATENT DOCUMENTS

JP  2011-239651 A  11/2011
JP  2013-208038 A  10/2013

(Continued)

*Primary Examiner* — Rashad H Johnson
(74) *Attorney, Agent, or Firm* — Mattingly & Malur, PC

(57) ABSTRACT

A coil bobbin of the present disclosure is a coil bobbin attached to a stator core of a distributed winding radial gap-type rotating electric machine, and includes a teeth holding portion and a slot insulator which are made of an insulator. The teeth holding portion has: a first wall surface that covers a first circumferential side surface of a tooth of the stator core; a second wall surface that covers at least a part of a second circumferential side surface of the tooth; and a third wall surface that covers both side surfaces in an axial direction of the tooth. The slot insulator is formed integrally with the first wall surface of the teeth holding portion, and has a plurality of through-holes extending in the axial direction and arrayed in a radial direction.

18 Claims, 13 Drawing Sheets

(56) References Cited

U.S. PATENT DOCUMENTS

| | | | |
|---|---|---|---|
| 2016/0172919 A1 | 6/2016 | Hattori | |
| 2016/0248308 A1* | 8/2016 | Ogawa | H02K 21/26 |
| 2019/0027989 A1* | 1/2019 | Ishigami | H02K 3/345 |
| 2020/0052542 A1* | 2/2020 | Gentz | H02K 3/522 |
| 2020/0156296 A1* | 5/2020 | E Silva | H02K 3/28 |
| 2020/0161916 A1* | 5/2020 | E Silva | H02K 3/345 |
| 2020/0161917 A1* | 5/2020 | E Silva | H02K 3/24 |
| 2020/0161918 A1* | 5/2020 | Almeida E Silva | H02K 3/12 |
| 2020/0161947 A1* | 5/2020 | Almeida E Silva | H02K 3/345 |
| 2020/0177057 A1* | 6/2020 | Uryu | H02K 3/30 |
| 2020/0366171 A1* | 11/2020 | Kimura | H02K 15/12 |
| 2021/0036568 A1* | 2/2021 | Schulz | H02K 3/12 |
| 2021/0135528 A1* | 5/2021 | Senoo | H02K 3/12 |
| 2021/0249926 A1* | 8/2021 | Enomoto | H02K 3/12 |
| 2021/0320538 A1* | 10/2021 | Lin | H02K 3/493 |
| 2021/0384779 A1* | 12/2021 | Takahashi | B60L 50/51 |
| 2022/0006344 A1* | 1/2022 | Sumitomo | H02K 3/14 |
| 2022/0021259 A1* | 1/2022 | Almeida E Silva | H02K 9/19 |

FOREIGN PATENT DOCUMENTS

| | | |
|---|---|---|
| JP | 2015-023771 A | 2/2015 |
| JP | 2016-187245 A | 10/2016 |

\* cited by examiner

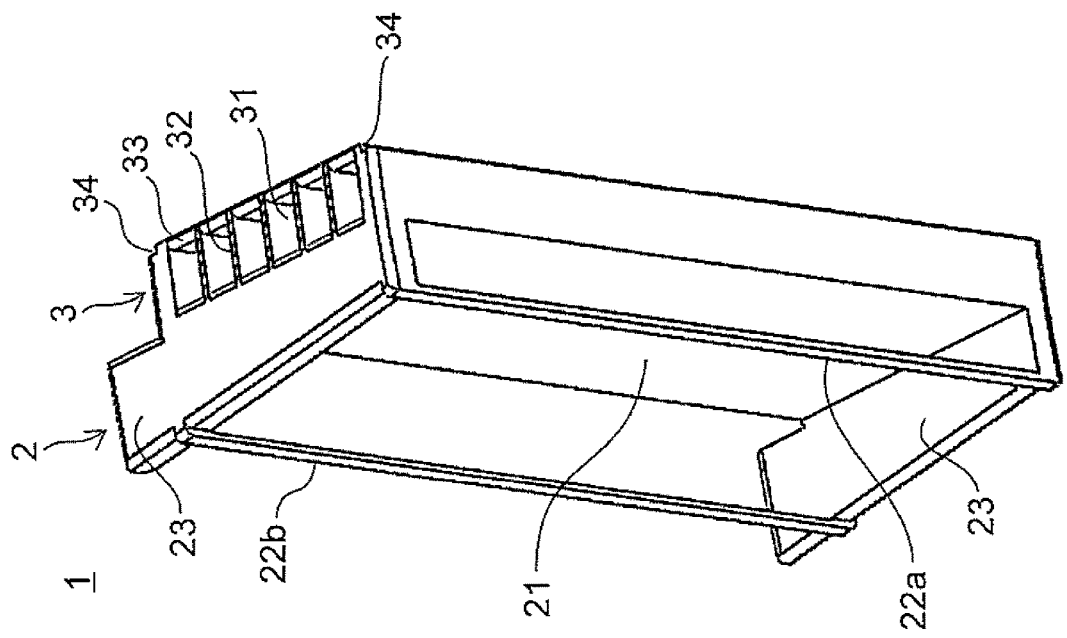
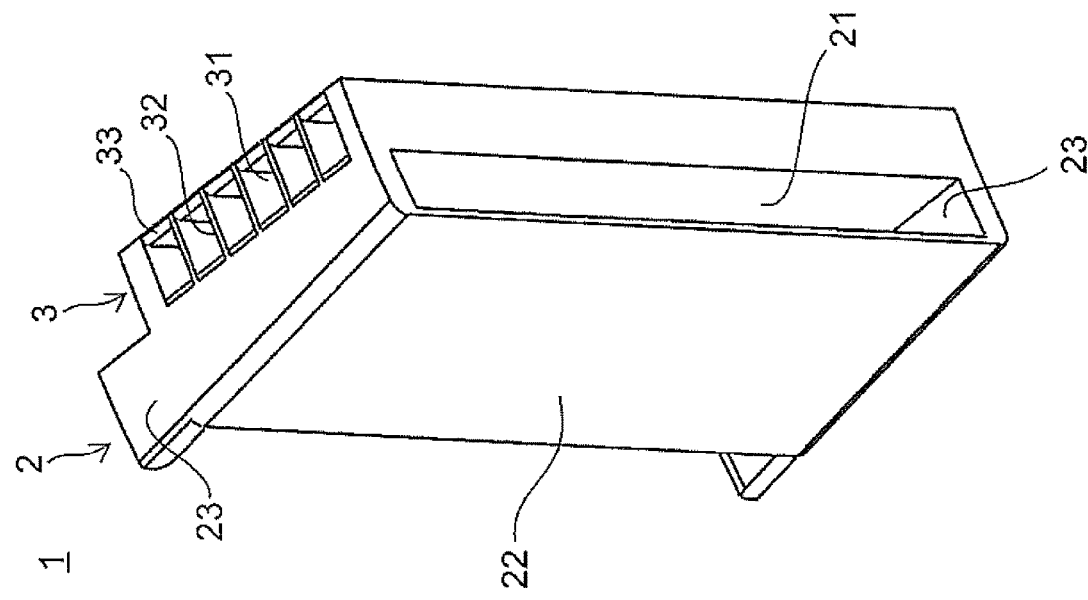

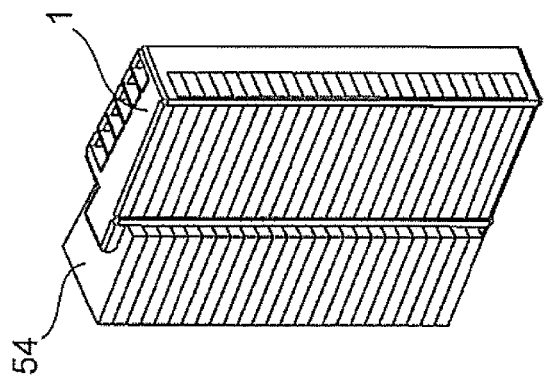
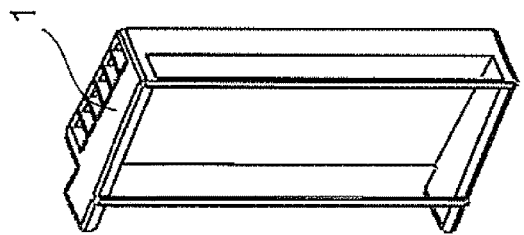
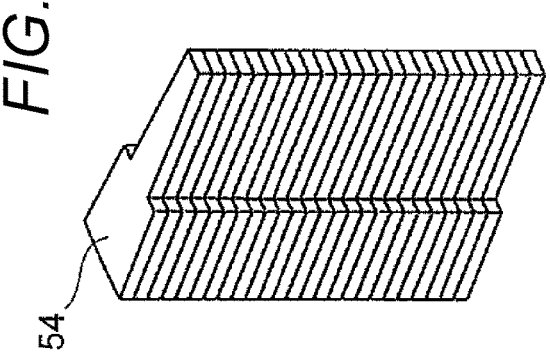
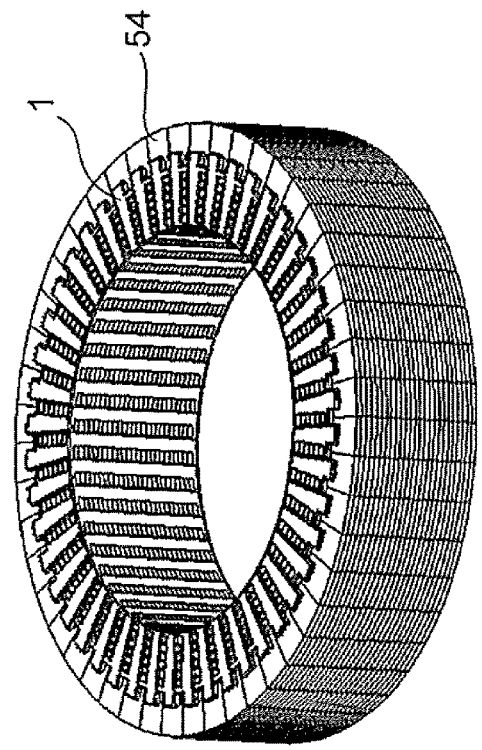

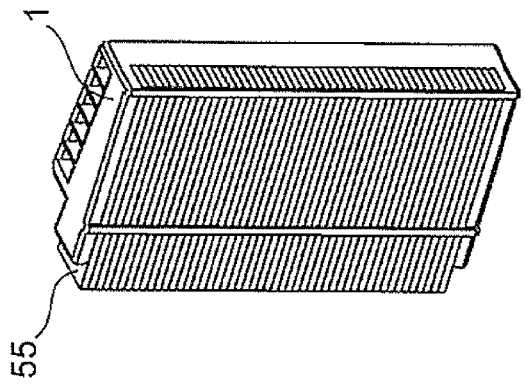
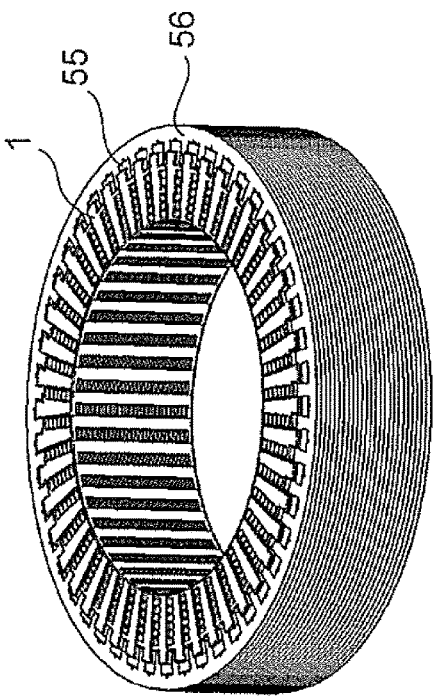
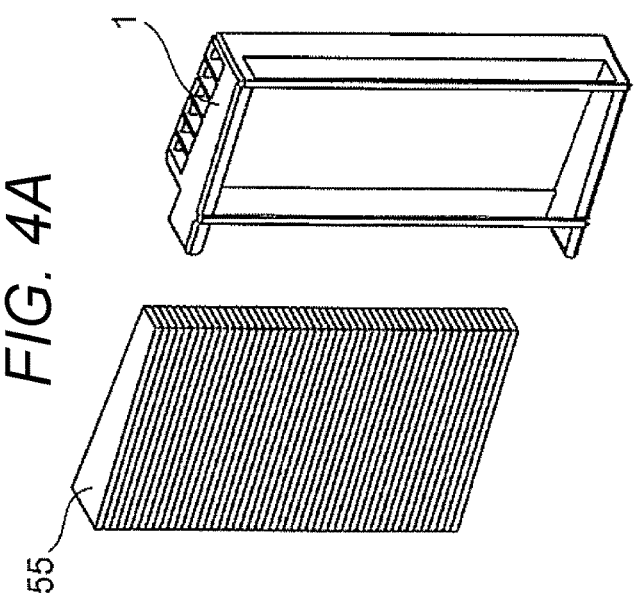
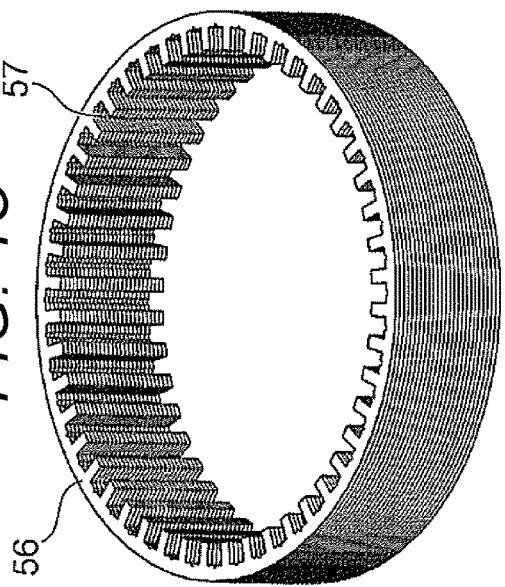

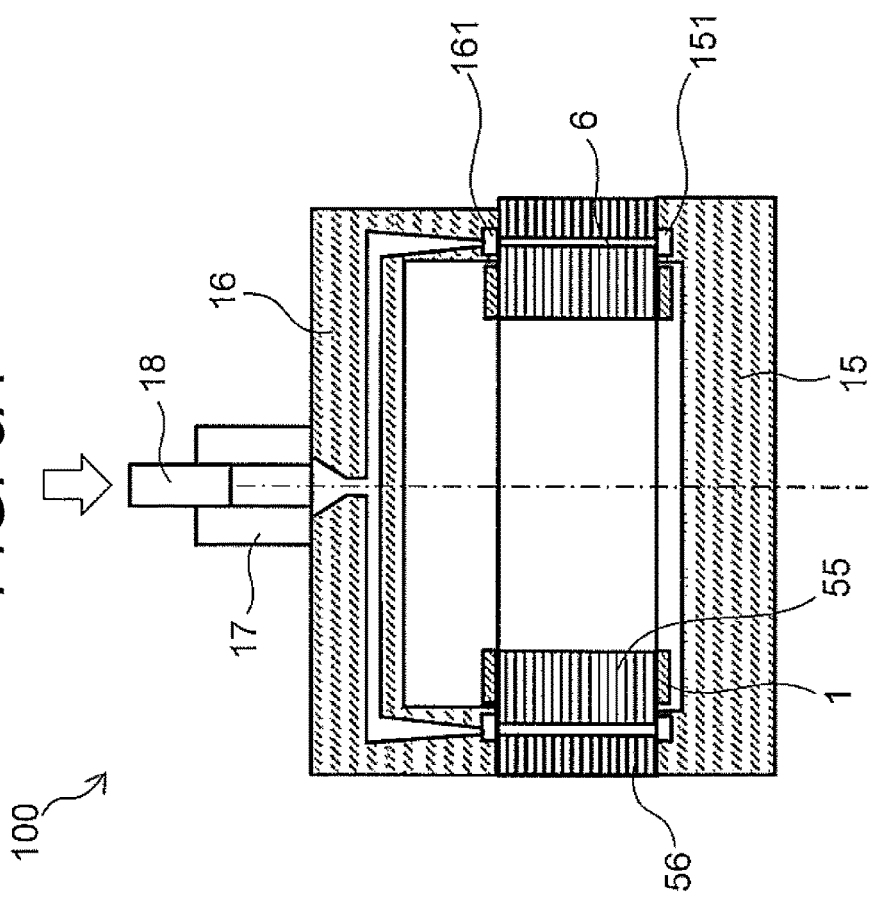
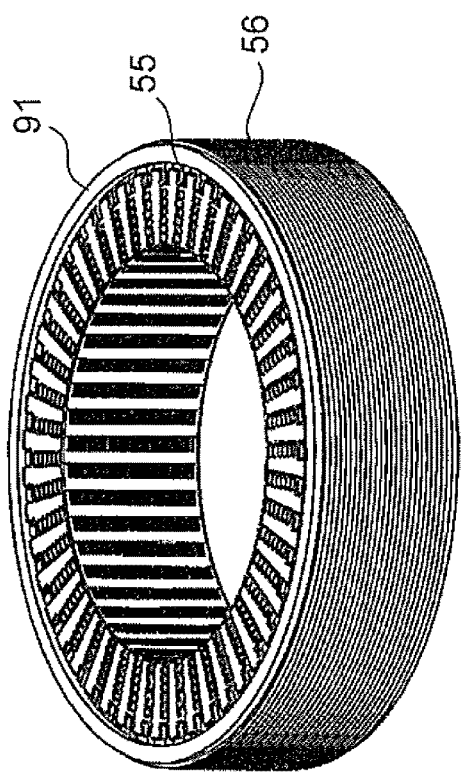
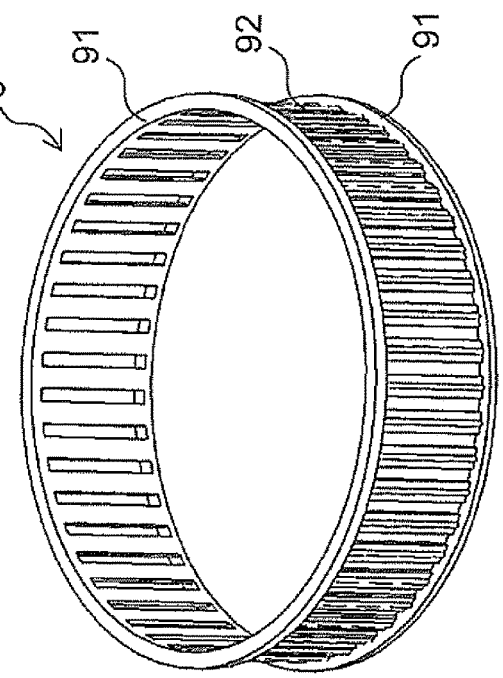

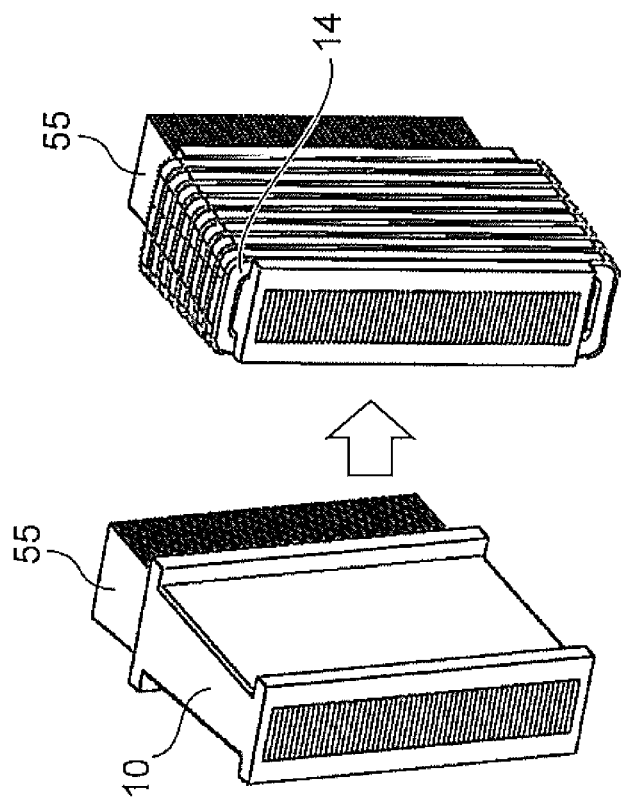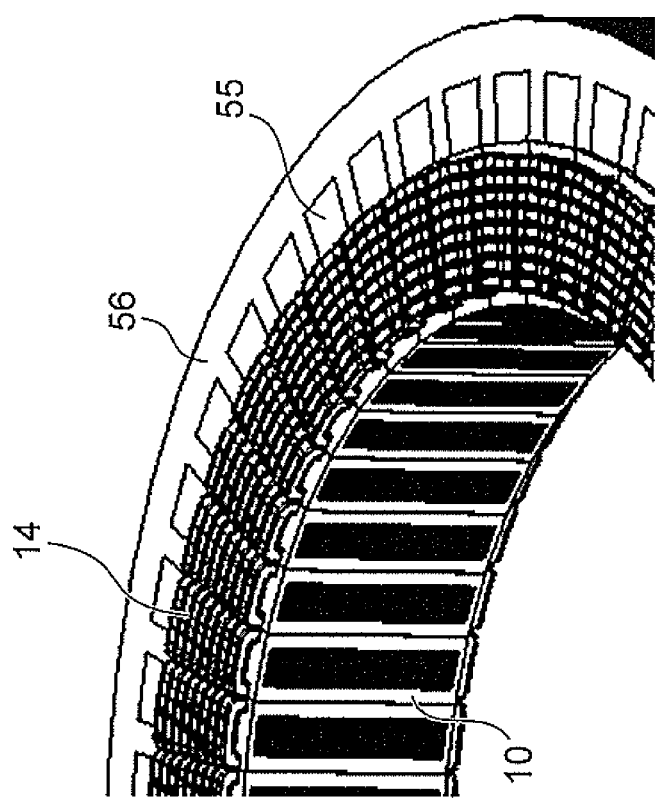

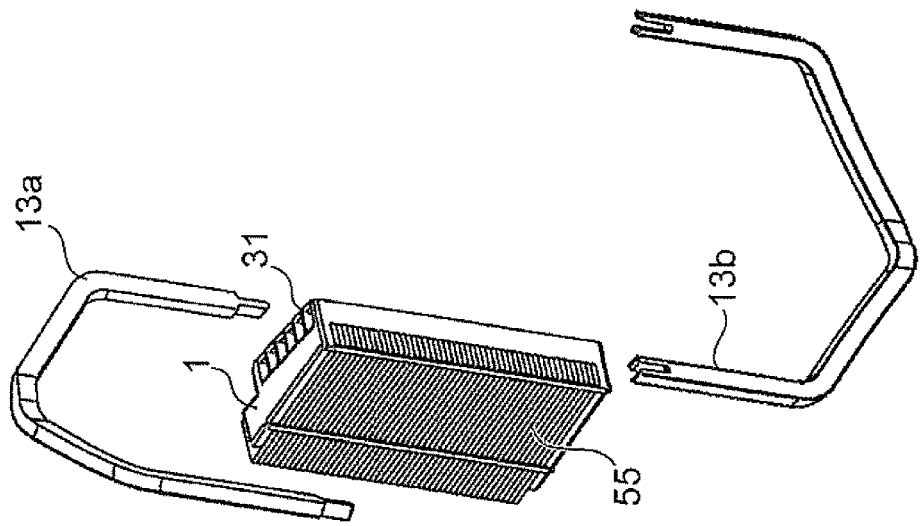
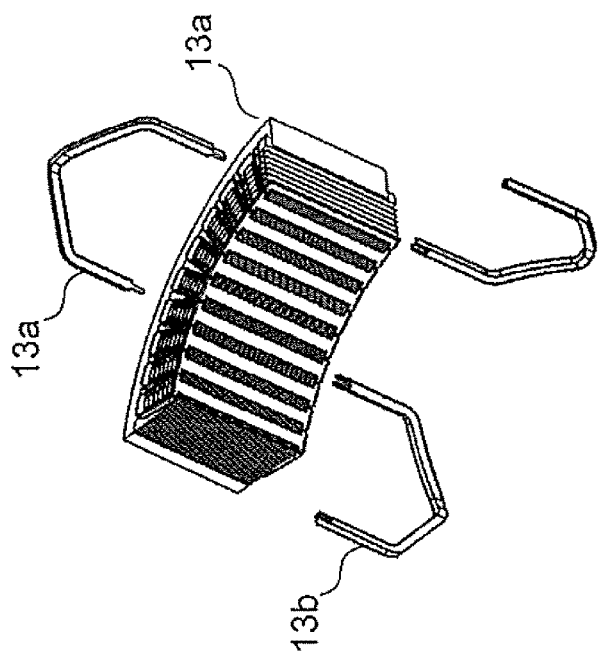
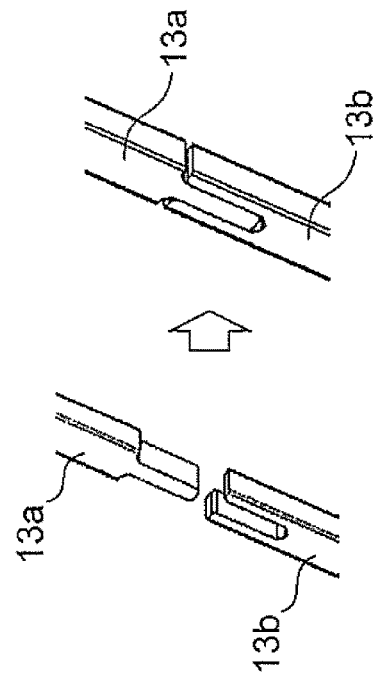

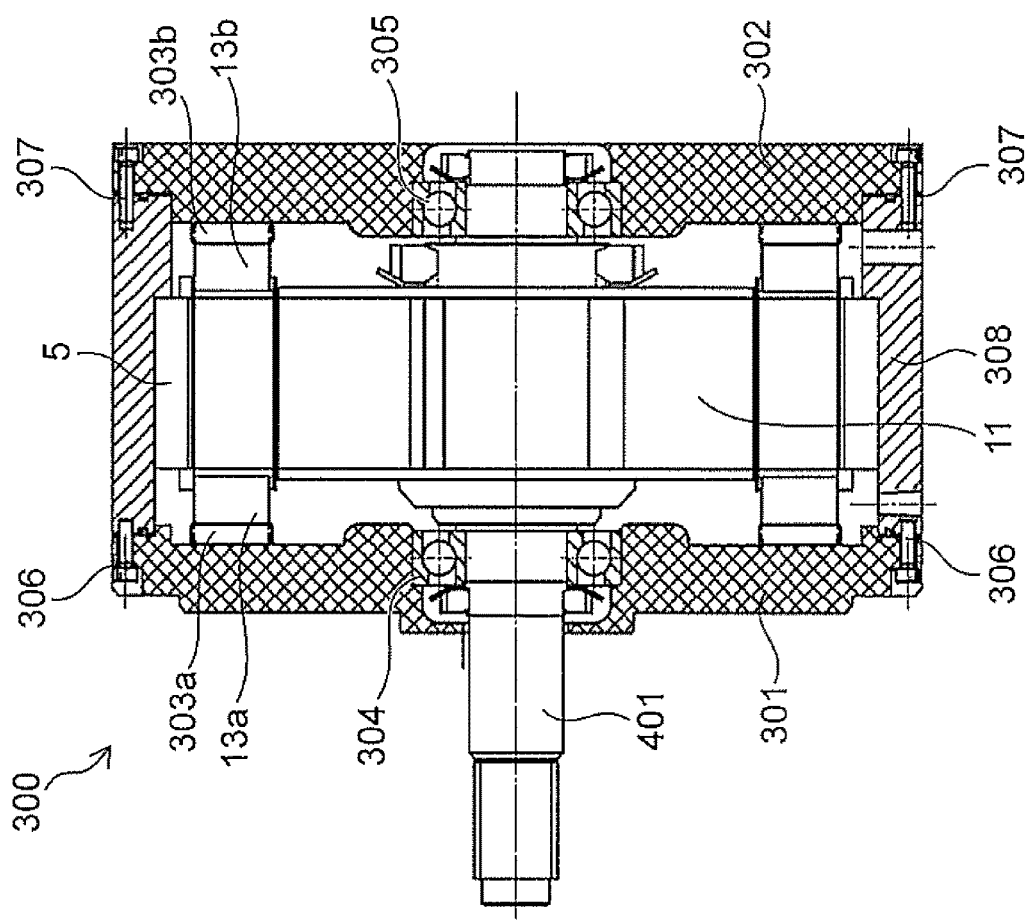
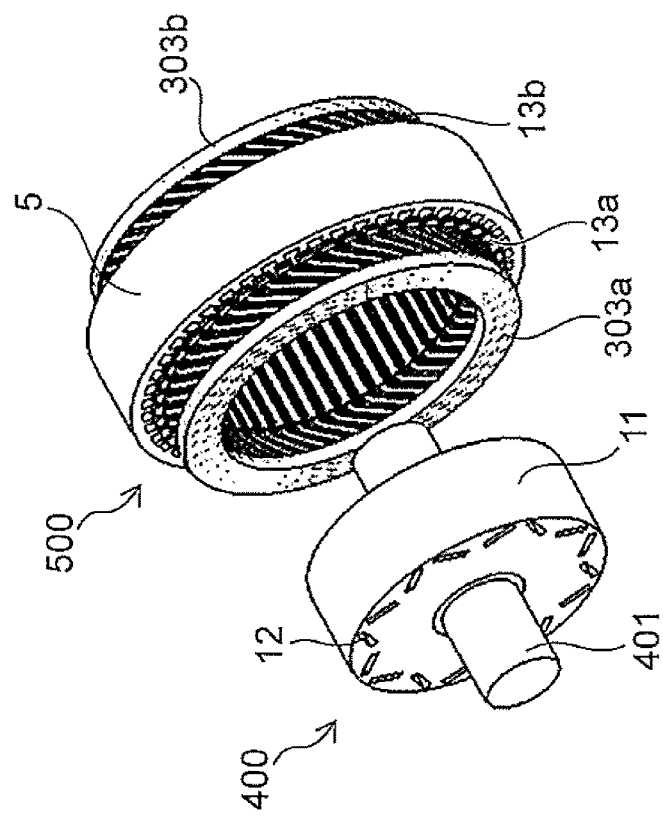
FIG. 13A
FIG. 13B

COIL BOBBIN, STATOR CORE OF DISTRIBUTED WINDING RADIAL GAP-TYPE ROTATING ELECTRIC MACHINE, AND DISTRIBUTED WINDING RADIAL GAP-TYPE ROTATING ELECTRIC MACHINE

CROSS REFERENCE TO RELATED APPLICATIONS

The present application claims priority from Japanese patent application JP 2020-020454 filed on Feb. 10, 2020, the entire content of which is hereby incorporated by reference into this application.

BACKGROUND OF THE INVENTION

1. Field of the Invention

The present disclosure relates to a coil bobbin, a stator core of a distributed winding radial gap-type rotating electric machine, and a distributed winding radial gap-type rotating electric machine.

2. Description of the Related Art

Improvement in efficiency is required for power sources of industrial machines and motors (rotating electric machines) used for driving automobiles. In order to improve the efficiency of a motor, it is necessary to reduce a loss of the motor, and it is common to use a technique of studying the design to reduce a coil copper loss and an iron loss of an iron core, which are two major factors of the motor loss. When output characteristics (rotation speed and torque) of the required motor specifications are determined, a mechanical loss is uniquely determined, and thus, the design to reduce the iron loss and copper loss is important.

The iron loss can be reduced by using a soft magnetic material. In general motors, an electromagnetic steel sheet is used for the iron core, and a characteristic that loss levels differ depending on a thickness, a Si content, or the like of the electromagnetic steel sheet is used. The soft magnetic material includes a high-performance material such as iron-based amorphous metal having a higher magnetic permeability than the electromagnetic steel sheet and low iron loss, finemet, and a nanocrystalline material that can be expected to have a high magnetic flux density. However, these material systems have many problems in manufacturing the motor at low cost, such as an extremely thin plate thickness of 0.025 mm and the hardness of 900 Vickers hardness, which is five times harder than an electromagnetic steel plate, and thus, it is not possible to apply those high-performance materials to the motor. On the other hand, the copper loss is mainly determined depending on the relationship between a coil resistance value and current, and measures, such as reduction of the coil resistance value by cooling and suppression of a decrease in residual magnetic flux density of a magnet, are taken.

Further, in recent automobile drive motors and the like, the design is made to increase a ratio (space factor) of a conductor to a cross-sectional area of a stator slot so as to reduce a resistance value to the limit of a theoretical limit. Although a rectangular wire coil is used to increase the space factor in the slot, coil ends at both end portions of the slot have a complicated structure so that the volume (wire length) of the coil ends becomes large when connecting those conductors by a method such as welding, and there occurs a problem that a resistance value slightly increases.

For example, JP 2011-239651 A describes a method of forming an annular coil by inserting a hairpin-shaped conductor segment having two legs into a stator core of a motor and bending a coil end on the opposite side to the inserted side to be welded with a bent coil end of another hairpin-shaped conductor segment, arranged in the circumferential direction. In the method described in JP 2011-239651 A, however, there is an effect of increasing a slot space factor, but it is necessary to bend a thick and hard rectangular conductor during manufacturing, and thus, stress is applied to the stator core, a slot insulator is damaged, and stress at the time of bending also remains at a connection portion. Therefore, there is a problem that it is difficult to secure the reliability of a welded joint, and there is room for improvement in terms of a manufacturing method. Further, it is necessary to provide a space around a welded portion in order to perform the welding, and thus, the coil end becomes large on the welded side.

JP 2015-23771 A is taken as a method for trying to improve such problems. JP 2015-23771 A discloses a method of forming a conductor coil by splitting a stator coil of a segment conductor insertion scheme in the axial direction, setting split end surfaces to have V-shapes that can be combined, and joining the V-shaped combining portions using a conductive paste adhesive. With this method, there is no welding at a coil end, and thus, it is possible to expect an effect that a resistance value of a coil can be suppressed to a low value by optimally designing a shape of the coil end. However, it is necessary to assemble conductors one by one by applying an adhesive, man-hours increase and there is a problem ensuring the reliability. It is known that a V-shaped fitting portion is generally difficult to make surface contact without using a conductive paste adhesive, and makes line contact somewhere on a V surface. Moreover, it is difficult to consider that all wires are held on the same axial surface when considering manufacturing variations, and it is difficult to manage each coil conductor at a position to achieve firm connection (contact).

JP 2013-208038 A discloses a configuration in which coils split in the axial direction are connected by a protrusion and a hole or by a convex shape and a concave shape. JP 2013-208038 A is also characterized in that connection is achieved in a state where a connection portion is visible in order to secure the connection reliability of the coil. After performing a connection process, a part of the split stator core is fitted to be assembled from the circumferential direction. Even in JP 2013-208038 A, there are problems such as confirmation of reliability of insertion of the contact and connection portion, an increase in man-hours, and an increase in man-hours for core assembly.

JP 2016-187245 A discloses a technique for connecting coil end surfaces having irregularities with each other similarly to JP 2013-208038 A. It is described that stress is applied to a part of a coil after inserting the coil into a slot to widen the inserted coil and to satisfy highly reliable connection (securing of the conductivity) with a caulking effect. Although the description regarding a means for widening the coil after inserting the coil into the core is not clear in JP 2016-187245 A, there is a concern that the number of steps may increase if a widening step is performed for all connection places.

SUMMARY OF THE INVENTION

Although JP 2011-239651 A, JP 2015-23771 A, JP 2013-208038 A, and JP 2016-187245 A disclose the techniques of downsizing the coil end by improving the structure of the coil conductor and reducing the contact resistance, there is no consideration for assembling the coil conductor with high positional accuracy without increasing the number of steps.

Further, as described in JP 2013-208038 A and the like, a split core obtained by splitting a stator core in the circumferential direction is formed by laminating electromagnetic steel sheets and thin plates of other soft magnetic materials, and needs to be formed as a laminate that can maintain its shape independently by using caulking or bonding. However, the caulking and bonding apply stress to the teeth core, which causes deterioration in magnetic characteristics and increases the iron loss of the motor.

Therefore, the present disclosure provides a technique for suppressing an iron loss of a stator core of a radial gap-type rotating electric machine and easily assembling a coil conductor having a distributed winding structure with high reliability.

In order to solve the above problems, a coil bobbin of the present disclosure is a coil bobbin attached to a stator core of a distributed winding radial gap-type rotating electric machine, and includes a teeth holding portion and a slot insulator which are made of an insulator. The teeth holding portion has: a first wall surface that covers a first circumferential side surface of a tooth of the stator core; a second wall surface that covers at least a part of a second circumferential side surface of the tooth; and a third wall surface that covers both side surfaces in an axial direction of the tooth. The slot insulator is formed integrally with the first wall surface of the teeth holding portion, and has a plurality of through-holes extending in the axial direction and arrayed in a radial direction.

Another characteristic relating to the present disclosure will become apparent from the description of the present specification and the accompanying drawings. Further, aspects of the present disclosure are achieved and realized by elements and combinations of various elements, and the following detailed description and aspects of the appended claims.

The description in the present specification is merely illustrative and is not intended to limit the scope of the claims or the application of the present disclosure by no means.

Advantageous Effects of Invention

According to the coil bobbin of the present disclosure, it is possible to suppress the iron loss of the stator core of the radial gap-type rotating electric machine and to easily assemble the coil conductor having the distributed winding structure with high reliability.

Other objects, configurations, and effects which have not been described above become apparent from embodiments to be described hereinafter.

BRIEF DESCRIPTION OF THE DRAWINGS

FIG. 2A is a perspective view illustrating a structure example of the coil bobbin according to the first embodiment; FIG. 2B is a perspective view illustrating another structure example of the coil bobbin;

FIG. 3A is a perspective view illustrating a state before the coil bobbin of FIG. 2B is attached to a T-shaped split core; FIG. 3B is a perspective view illustrating a state where the coil bobbin is attached to the T-shaped split core; FIG. 3C is a perspective view illustrating a state where the coil bobbins are attached to all the T-shaped split cores to assemble the stator core;

FIG. 4A is a perspective view illustrating a state before the coil bobbin of FIG. 2B is attached to a teeth core of an I-shaped split core; FIG. 4B is a perspective view illustrating a state where the coil bobbin is attached to the teeth core of the I-shaped split core; FIG. 4C is a perspective view illustrating a back yoke of the I-shaped split core; FIG. 4D is a perspective view illustrating a state where the coil bobbins are attached to all the teeth cores and fitted to the back yoke;

FIG. 8A is a cross-sectional view illustrating an injection molding apparatus configured to inject a resin into a gap between the I-shaped split cores;

FIG. 8B is a perspective view illustrating a stator core after the resin injection;

FIG. 8C is a perspective view illustrating a resin molded body;

FIG. 11A is a perspective view for describing a conventional coil bobbin for a concentrated winding motor;

FIG. 11B is a perspective view illustrating an assembled state of a stator having a concentrated winding structure;

FIG. 12A is a perspective view illustrating a state before a segment conductor is inserted into the slot; FIG. 12B is an enlarged perspective view near a connection portion between the segment conductors; FIG. 12C is a view illustrating a method of inserting the segment conductor into the coil bobbin; and FIG. 13A is a perspective view illustrating a stator and a rotor to which the coil bobbin according to the embodiment is applied; and FIG. 13B is a cross-sectional view of a motor.

DESCRIPTION OF THE PREFERRED EMBODIMENTS

Hereinafter, embodiments of the present disclosure will be described with reference to the drawings. The following descriptions illustrate specific examples of a technique of the present disclosure. The technique of the present disclosure is not limited to these descriptions, and various changes and modifications by those skilled in the art can be made within the scope of the technical idea disclosed in the present specification. Further, the same reference signs will be attached to those having the same function in the entire drawing for describing the embodiments, and the repetitive description thereof will be omitted in some cases.

In the present specification, a direction along a rotation axis of a rotor (not illustrated) of a radial gap-type rotating electric machine is defined as an "axial direction", a radius direction (radial direction) of the rotor about the rotation axis is defined as a "radial direction", and a direction along a rotation direction of the rotor is defined as a "circumferential direction".

First Embodiment

Structure Example of Stator Core

Figure 1B:
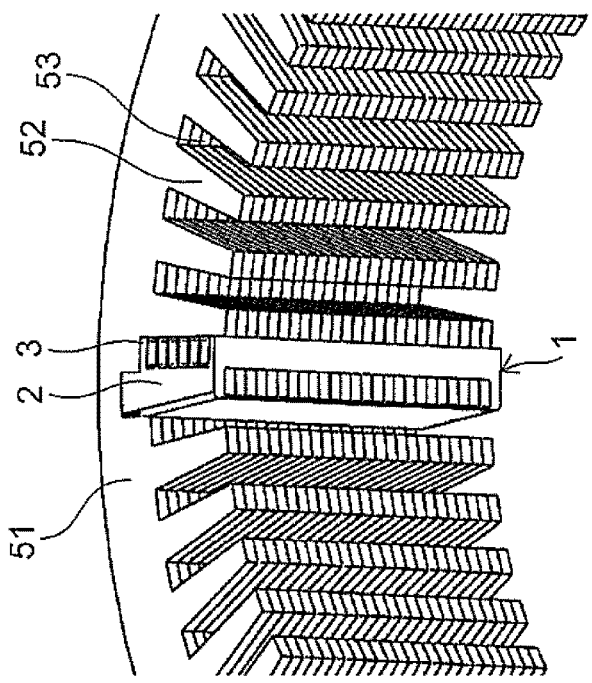
FIG. 1B is a perspective view illustrating a state where a coil bobbin according to a first embodiment is attached to the integral stator core.
Figure 1A:
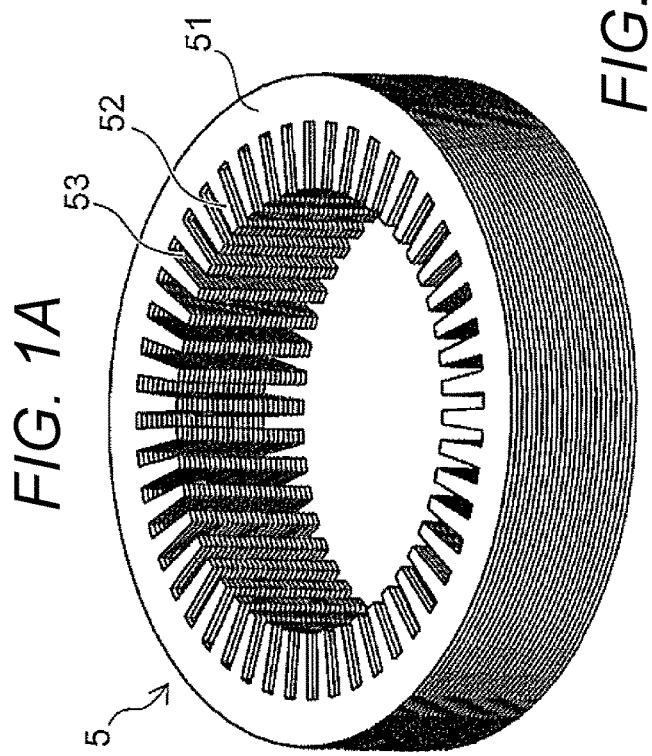
FIG. 1A is a perspective view illustrating an integral stator core of a radial gap-type rotating electric machine.

FIG. 1A is a perspective view illustrating a general structure of an integral stator core 5 of a radial gap-type rotating electric machine. As illustrated in FIG. 1A, the integral stator core 5 is formed as an annular core back 51 and a plurality of teeth 52 are integrated, and is formed by, for example, laminating a plurality of electromagnetic steel sheets or soft magnetic materials punched by a press in the axial direction. The teeth 52 protrude radially inward from the core back 51, and are spaced apart from each other in the circumferential direction. A space between two adjacent teeth 52 is a slot 53. The tooth 52 has a substantially isosceles trapezoidal cross-sectional shape in a plane perpendicular to the axial direction, and has a shape that widens from the inner side to the outer side in the radial direction. Although 48 teeth 52 and slots 53 are formed in the integral stator core 5 of FIG. 1A, but the number thereof is not limited.

FIG. 1B is a perspective view illustrating a state where only one coil bobbin 1 of the present embodiment is attached to the integral stator core 5. Although details of the coil bobbin 1 will be described later, the coil bobbin 1 includes a teeth holding portion 2 and a slot insulator 3, which are integrally formed. The teeth holding portion 2 has a shape that widens from the inner side to the outer side in the radial direction, and forms a space having the same shape as the tooth 52. With such a structure, the teeth holding portion 2 can be attached to the tooth 52 from the inner side to the outer side in the radial direction. The slot insulator 3 is arranged in the slot 53 of the integral stator core 5.

Figure 1C:
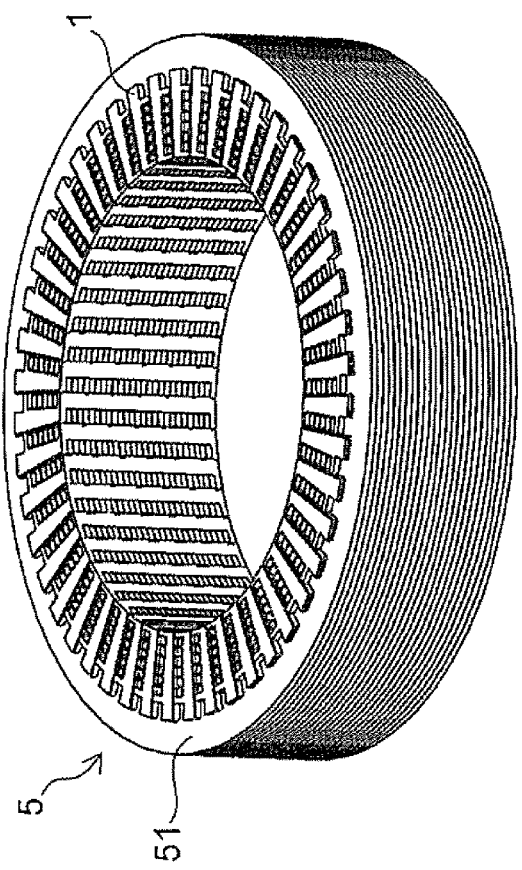
FIG. 1C is a perspective view illustrating a state where the coil bobbins are attached to all teeth.

FIG. 1C is a perspective view illustrating a state where the coil bobbins 1 are attached to all of the 48 teeth 52. As illustrated in FIG. 1C, when the coil bobbins 1 are attached to all the teeth 52, the adjacent coil bobbins 1 are in contact with each other.

Structure Example of Coil Bobbin

FIG. 2A is a perspective view illustrating a structure example of the coil bobbin 1 according to the first embodiment. The coil bobbin 1 of the present embodiment is attached to the stator core (for example, the integral stator core illustrated in FIG. 1A) of the radial gap-type rotating electric machine, and is used to assemble a distributed winding rectangular wire coil.

As illustrated in FIG. 2A, the coil bobbin 1 includes the teeth holding portion 2 and the slot insulator 3 which are integrally formed. The teeth holding portion 2 is attached to the tooth of the stator core, and the slot insulator 3 is arranged in the slot of the stator core.

The teeth holding portion 2 has a first wall surface 21, a second wall surface 22 and two third wall surfaces 23, and the tooth is housed in a space surrounded by these first to third wall surfaces 21 to 23. The first wall surface 21 covers one of circumferential side surfaces of the tooth (first circumferential side surface of the tooth), and the second wall surface 22 covers the other circumferential side surface of the tooth (second circumferential side surface of the tooth).

The two third wall surfaces 23 respectively cover axial side surfaces of the teeth. Note that the teeth holding portion 2 does not have a wall surface that covers radially inner side surfaces of the tooth in the example illustrated in FIG. 2A, but may have these.

The slot insulator 3 is integrally formed with the first wall surface 21 of the teeth holding portion 2, and has a plurality of through-holes 31, a plurality of partition walls 32, and a fourth wall surface 33. The plurality of partition walls 32 are arrayed in the radial direction and extend in the axial direction. The fourth wall surface 33 opposes the first wall surface 21.

The first wall surface 21, the plurality of partition walls 32, and the fourth wall surface 33 define the plurality of through-holes 31 each extending in the axial direction. Each of the through-holes 31 has a shape and a size into which a rectangular wire coil conductor can be inserted. With such a through-hole 31, it becomes easy to insert the coil conductor in the slot in parallel to the axial direction.

A material of the coil bobbin 1 is, for example, is a highly insulating resin (polymer compound) such as a PBT resin, a PPS resin, an LCP resin, a polyamide resin, and an ABS resin or an insulator such as glass, mica, and ceramics. Since the insulating resin, particularly the PPS resin and the LCP resin, have excellent moldability and enables the coil bobbin 1 to be manufactured by injection molding, the insulation thickness can be reduced with high dimensional accuracy. As the coil bobbin 1 of the insulator is attached to the tooth, it is possible to prevent a short circuit between the coil conductor and the stator core.

Each component of the teeth holding portion 2 and the slot insulator 3 is configured to have a wall thickness of 0.2 mm to 0.4 mm (sometimes referred to as "insulation thickness" or "insulation distance"). As the insulation thickness is reduced in this manner, a space factor is improved, and the heat conduction performance is also improved. As described above with reference to FIG. 1C, when the coil bobbins 1 are attached to all the teeth, the first wall surface 21 of a certain coil bobbin 1 and the fourth wall surface 33 of the adjacent coil bobbin 1 are in contact with each other. Therefore, the total thickness of the insulator (insulation thickness) becomes thicker at a contact place between the first wall surface 21 and the fourth wall surface 33.

FIG. 2B is a perspective view illustrating another structure example of the coil bobbin 1. The coil bobbin 1 of FIG. 2B is different from the coil bobbin 1 of FIG. 2A in terms of having two columnar second wall surfaces 22a and 22b that cover only both radial end portions, instead of the second wall surface 22 that covers the entire one circumferential side surface (second circumferential side surface) of the tooth. Further, notches 34 are provided at the both radial end portions of the fourth wall surface 33 of the slot insulator 3, so that the second wall surfaces 22a and 22b of the adjacent coil bobbins 1 can be assembled. With such a configuration, it is possible to prevent an increase in thickness of the insulator (insulation thickness) at the contact place between the two adjacent coil bobbins 1, and to prevent generation of a gap between the coil bobbins 1. In other words, the thickness (insulation thickness) of the insulator covering the circumferential side surface of the tooth can be made constant.

Another Structure Example of Stator Core

FIG. 3A is a perspective view illustrating a state before the coil bobbin 1 of FIG. 2B is attached to a T-shaped split core 54. As illustrated in FIG. 3A, the coil bobbin 1 of the present embodiment can be applied not only to the integral stator core but also to the T-shaped split core 54 in which the stator core is divided each by one pole in the circumferential direction.

FIG. 3B is a perspective view illustrating a state where the coil bobbin 1 of FIG. 2B is attached to the T-shaped split core 54. As illustrated in FIG. 3B, it can be understood that the tooth can be held even if the second wall surfaces 22a and 22b are located only at the both radial end portions of the tooth.

FIG. 3C is a perspective view illustrating a state where the coil bobbins 1 are attached to all the T-shaped split cores 54 and the stator cores are assembled. As illustrated in FIG. 3C, the stator core is obtained by assembling the coil bobbins 1 and the T-shaped split cores 54 which are integrated in advance.

FIG. 4A is a perspective view illustrating a state before the coil bobbin 1 of FIG. 2B is attached to a teeth core 55 of an I-shaped split core. As illustrated in FIG. 4A, the coil bobbin 1 of the present embodiment can also be applied to the teeth core 55 divided each by one pole. A material of the teeth core 55 may be an electromagnetic steel sheet, but may be a soft magnetic material such as an iron-based amorphous metal, finemet, or a nanocrystalline material. The loss of the motor can be reduced by using a soft magnetic material for the teeth core 55 of the I-shaped split core.

FIG. 4B is a perspective view illustrating a state where the coil bobbin 1 of FIG. 2B is attached to the teeth core 55 of the I-shaped split core. As illustrated in FIG. 4B, it can be understood that the tooth can be held even if the second wall surfaces 22a and 22b are arranged only at the both radial end portions of the tooth.

FIG. 4C is a perspective view illustrating a back yoke 56 of the I-shaped split core. The back yoke 56 has an annular shape and has a plurality of recesses 57 provided along the inner circumference. The teeth cores 55 can be fitted in the recesses 57 of the back yoke 56, whereby the teeth cores 55 protrude radially inward to form teeth of the stator core.

A material of the back yoke 56 can be, for example, an electromagnetic steel sheet. When the teeth core 55 is made of the soft magnetic material and the back yoke 56 is made of the electromagnetic steel sheet, the material cost can be reduced as compared with a case where the both are made of the soft magnetic material. The teeth core 55 and the back yoke 56 may be made of the same material.

FIG. 4D is a perspective view illustrating a state where the coil bobbins 1 are attached to all the teeth cores 55 and fitted to the back yoke 56. As illustrated in FIG. 4D, the stator core is obtained by assembling the coil bobbins 1 and the teeth cores 55 which are integrated in advance.

All the above-described integral stator core, T-type split core, and I-type split core (FIGS. 1, 3, and 4) have the same function. The stator can be configured by inserting and assembling the coil conductor into the through-hole 31 of the slot insulator 3.

Conventionally, in the T-type split core and the I-type split core, teeth core that is formed by laminating electromagnetic steel sheets or thin plates of other soft magnetic materials need to be formed as a laminate, capable of maintaining the shape independently, using caulking and bonding. However, the caulking and bonding apply stress to the teeth core, which causes deterioration in magnetic characteristics and increases the iron loss of the motor. On the other hand, according to the coil bobbin 1 of the present embodiment, the teeth of the T-shaped split core or the I-shaped split core can be held without applying stress due to the friction in the axial direction between the teeth holding portion 2 and the tooth and the friction between the circumferential surfaces. Since the teeth holding portion 2 can firmly hold the tooth, the tooth and the coil bobbin 1 can be uniquely and accurately configured with a good positional relationship.

Further, in the coil bobbin 1 of the present embodiment, the teeth holding portion 2 and the slot insulator 3 are integrally formed, and the through-hole 31 into which the coil conductor is inserted can be arranged without assembly backlash, so that the coil conductor can be assembled with high positional accuracy. As a result, the reliability of the motor is improved. As described above, the coil bobbin 1 of the present embodiment can achieve both the holding of the teeth and the insulation between the coil conductor and the stator core.

Figure 5B:
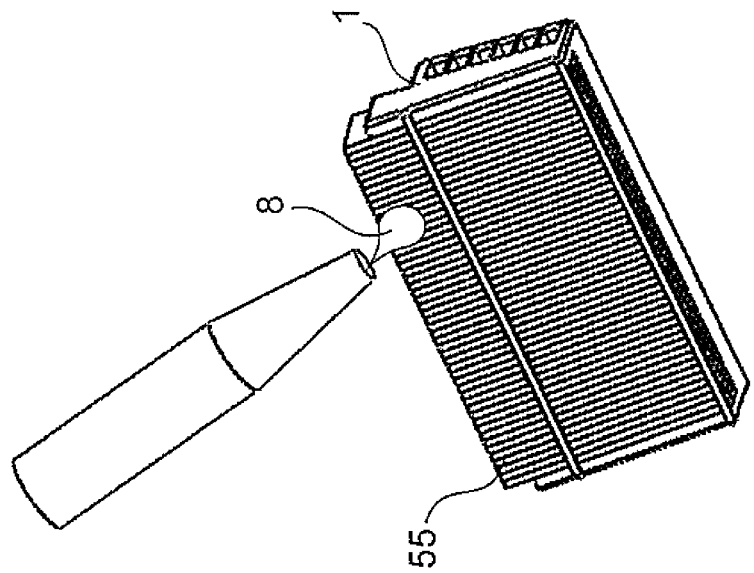
FIG. 5B is a perspective view illustrating another fixing method.
Figure 5A:
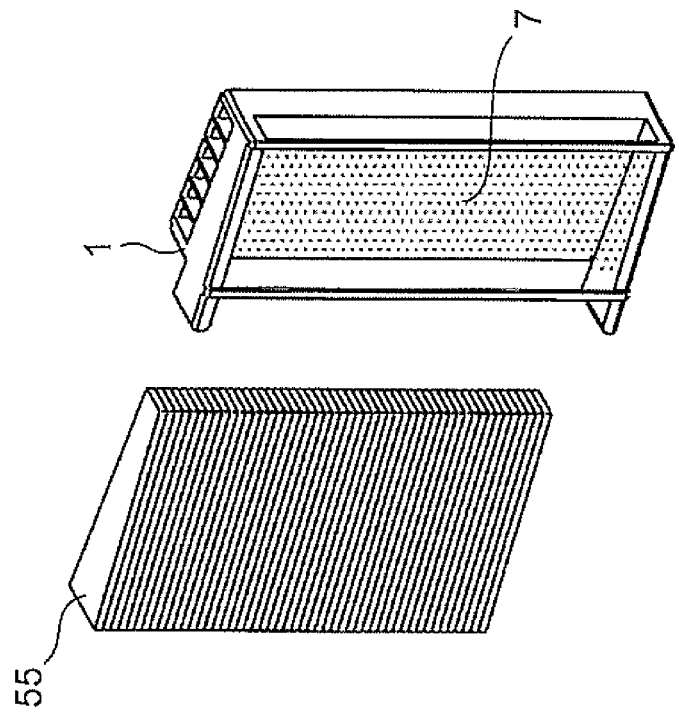
FIG. 5A is a perspective view illustrating an example of a method of fixing the teeth core of the I-shaped split core and the coil bobbin.

FIG. 5A is a view illustrating an example of a method of fixing the teeth core 55 of the I-shaped split core and the coil bobbin 1. As illustrated in FIG. 5A, first, a thermoplastic adhesive layer 7 is applied to an inner surface of the teeth holding portion 2 of the coil bobbin 1 by spraying. As the adhesive layer 7, for example, one that melts at a temperature higher than a drive limit temperature of the motor (for example, 155° C. for F type) can be used. Next, after the teeth core 55 is inserted into the teeth holding portion 2 of the coil bobbin 1, the resultant is heated to a melting temperature of the adhesive layer 7 by a heating treatment in a constant temperature bath or a continuous furnace, and then, cooled. As a result, the teeth core 55 and the coil bobbin 1 can be firmly integrated. At this time, as the material of the coil bobbin 1, it is necessary to use a material having higher glass transition point and softening temperature than the melting temperature of the adhesive layer 7.

FIG. 5B is a view illustrating another example of a method of fixing the teeth core 55 of the I-shaped split core and the coil bobbin 1. In this method, first, the teeth core 55 is inserted into the teeth holding portion 2 of the coil bobbin 1 as illustrated in FIG. 5B. Next, the teeth core 55 is coated with an adhesive 8 having a low viscosity. The teeth core 55 is, for example, the laminate of soft magnetic materials, and thus, has a gap and can absorb a liquid having a low viscosity due to a capillary phenomenon. When the adhesive 8 is applied, the teeth core 55 and the coil bobbin 1 can be firmly integrated by applying an appropriate amount that does not cause a dimensional change on the surfaces of the teeth core 55 and the coil bobbin 1. As the adhesive 8, a known adhesive such as an acrylic resin type and an epoxy resin type can be used.

Figure 6A:
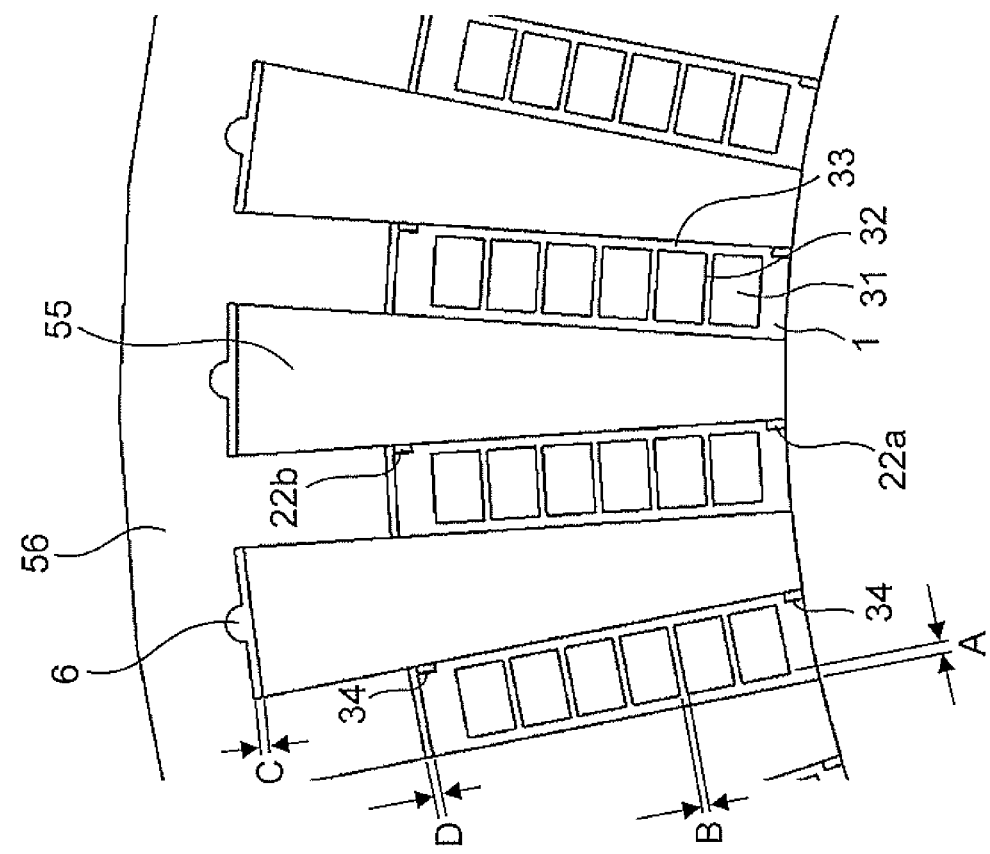
FIG. 6A is a plan view illustrating a fitting state between the teeth core and the back yoke of the I-shaped split core.

Next, the assembly of the stator core will be described. FIG. 6A is a plan view illustrating a state where the teeth core 55 to which the coil bobbin 1 has been attached is assembled with the back yoke 56. In order to fit the teeth core 55 to the back yoke 56, a gap is required therebetween.

Therefore, the teeth core 55 is attached to the back yoke 56 so as to have a slight gap before the state of FIG. 6A, and then, the teeth core 55 is moved radially outward to bring the circumferential side surface of the teeth core 55 and the circumferential side surface of the back yoke 56 into close contact with each other.

At that time, a gap 6 is generated between the teeth core 55 and the back yoke 56 in the radial direction as illustrated in FIG. 6A.

Figure 6B:
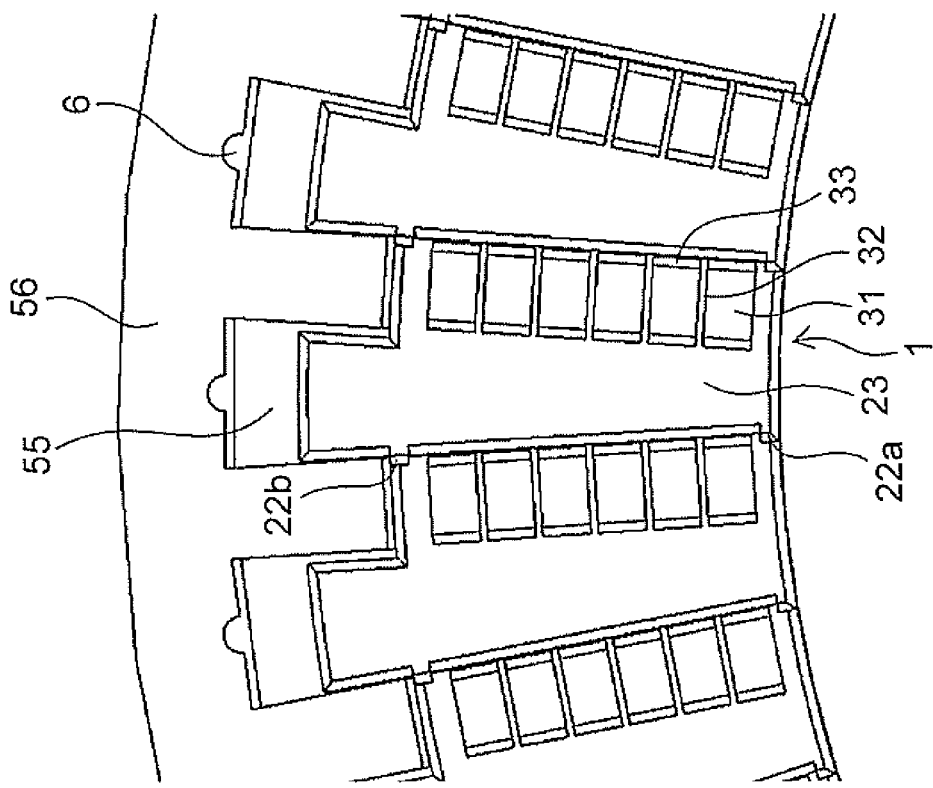
FIG. 6B is a cross-sectional view taken along a plane perpendicular to the paper surface.

FIG. 6B is a cross-sectional view of a plane perpendicular to the paper surface (axial direction) of FIG. 6A. As illustrated in FIG. 6B, a dimension A of the first wall surface 21 and a dimension B of the partition wall 32 of the coil bobbin 1 can be set to 0.2 to 0.4 mm as described above. Since the coil bobbin 1 is formed as thin as possible in this manner, it is possible to expect the improvement in space factor and the improvement in heat conduction performance. Further, it is desirable to set a radial dimension C of the gap 6 between the teeth core 55 and the back yoke 56 and a radial dimension D of the gap 61 between the back yoke 56 and the slot insulator 3 as small as possible. Further, the slot insulator 3 has the notches 34 at the places where the second wall surfaces 22a and 22b come into contact with the adjacent coil bobbins 1 as illustrated in FIG. 6B, and thus, the insulation thickness between the tooth and the coil conductor does not increase and becomes constant even if the second wall surfaces 22a and 22b overlap the slot insulator 3.

Figure 7:
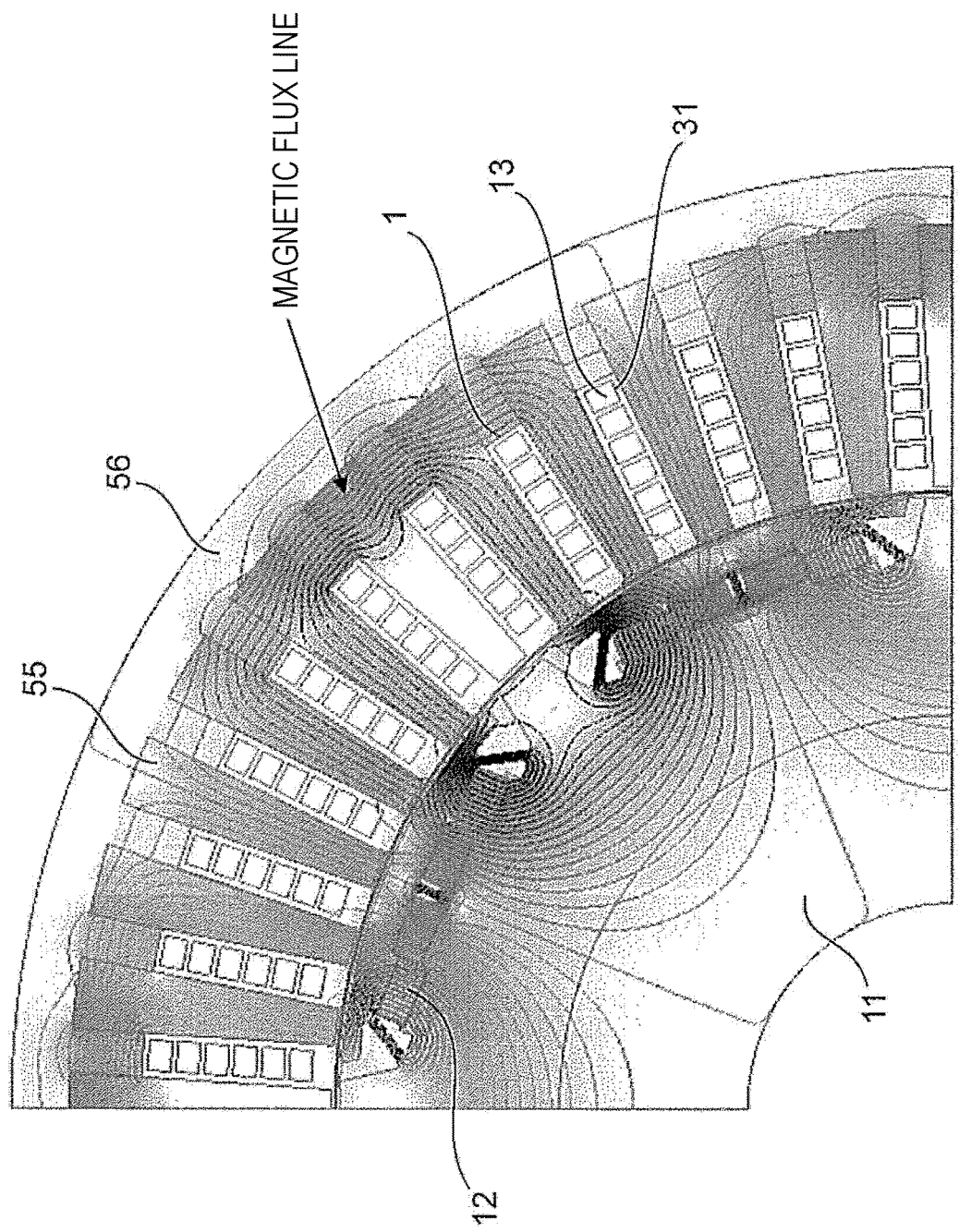
FIG. 7 is a view illustrating a result of electromagnetic field analysis performed on a rotating electric machine that employs the I-shaped split core.

FIG. 7 is a view illustrating a result of electromagnetic field analysis performed on a rotating electric machine that employs an I-shaped split core. As illustrated in FIGS. 6A and 6B, the coil bobbins 1 were attached to the teeth cores 55 of the I-shaped split core, the teeth cores 55 were assembled to the back yoke 56 to form a stator core, and coil conductors 13 were inserted into the through-holes 31. Thereafter, a rotor core 11 and permanent magnets 12 were installed to perform electromagnetic field analysis, and the performance as a motor was predicted. Magnetic flux lines flowing from the permanent magnets 12 to the rotor core 11 and magnetic flux lines flowing from the permanent magnets 12 to the stator core are obtained as illustrated in FIG. 7.

When viewing magnetic flux lines that flow from the teeth cores 55 to the back yoke 56, it can be understood that most of the magnetic flux lines flow in the circumferential direction and little magnetic flux flows in the radial direction. In this manner, it can be understood that there is no problem in the performance of the motor even if the above-described gap 6 exists.

FIG. 8A is a cross-sectional view illustrating an injection molding apparatus 100 configured to integrate the teeth cores 55 of the I-shaped split core and the back yoke 56. As illustrated in FIG. 8A, the injection molding apparatus 100 includes a lower mold 15, an upper mold 16, a pot 17, and a plunger 18. The lower mold 15 and the upper mold 16 have annular recesses 151 and 161 respectively. The pot 17 can be filled with a resin, and the resin can be injected and pressure-molded by operating the plunger 18. The stator core in which the coil bobbins 1, the teeth cores 55 and the back yoke 56 have been assembled is installed between the lower mold 15 and the upper mold 16, and the resin is injected in the gap 6 between the teeth core 55 and the back yoke 56.

FIG. 8B is a perspective view illustrating the stator core after the resin injection. As illustrated in FIG. 8B, a resin molded body 9 is formed by injecting the resin into the gap 6 and performing pressure-molding. The resin molded body 9 has an annular collar portion 91 derived from the recesses 151 and 161 of the lower mold 15 and the upper mold 16. The collar portion 91 straddles the axial side surfaces of the teeth core 55 and the back yoke 56 so as to cover a boundary between the teeth core 55 and the back yoke 56.

FIG. 8C is a perspective view illustrating the resin molded body 9. As illustrated in FIG. 8C, the resin molded body 9 includes: a columnar portion 92 derived from the gap 6 between the teeth core 55 and the back yoke 56; and the annular collar portion 91 derived from the recesses 151 and 161 of the lower mold 15 and the upper mold 16. In this manner, the resin molded body 9 has a cage shape inside the stator core, and each surface thereof is bonded to the teeth core 55 and the back yoke 56, and thus, can be firmly integrate the teeth core 55 and the back yoke 56.

Figure 9:
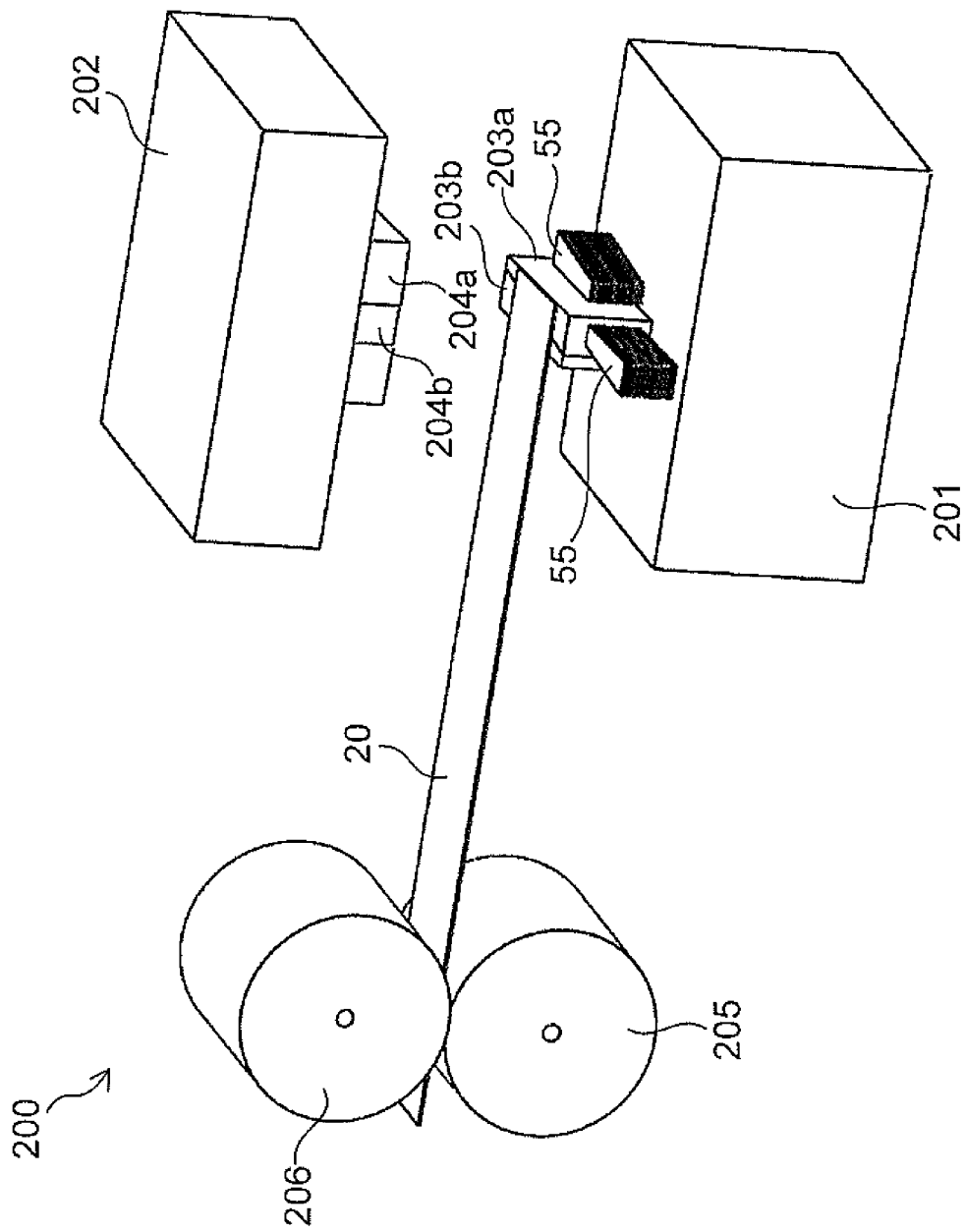
FIG. 9 is a schematic view illustrating an example of a manufacturing apparatus of the teeth core of the I-shaped split core.

FIG. 9 is a schematic view illustrating an example of a manufacturing apparatus 200 of the teeth core 55 of the I-shaped split core. As illustrated in FIG. 9, the manufacturing apparatus 200 includes a lower die holder 201, an upper die holder 202, lower cutting blades 203a and 203b, upper cutting blades 204a and 204b, and rollers 205 and 206. A soft magnetic material 20, which is a material of the teeth core 55, is sandwiched between the rollers 205 and 206 in the form of a foil strip or a thin plate, and a fixed amount thereof is fed between the lower die holder 201 and the upper die holder 202 by the rotation of the rollers 25 and 26. The upper die holder 202 is configured to be vertically movable, and the soft magnetic material 20 is sheared by the lower cutting blades 203a and 203b and the upper cutting blades 204a and 204b. Since the teeth core 55 has a substantially trapezoidal shape, two different teeth cores 55 can be alternately manufactured by the same operation by cutting two pieces at the same time.

Conventional Coil Insertion Method

Figure 10A:
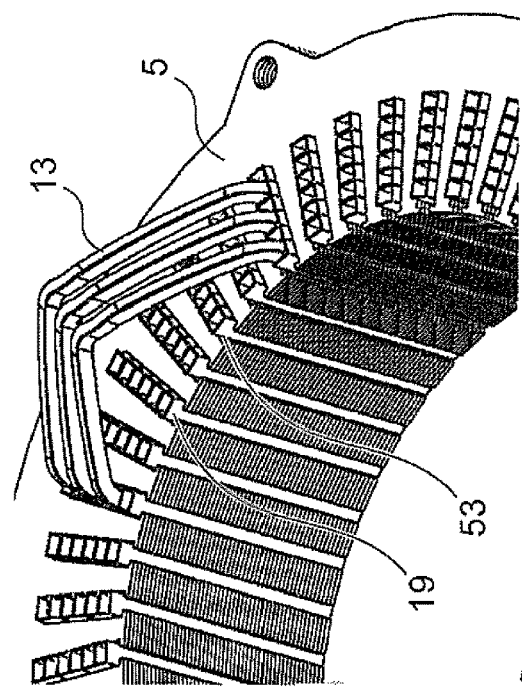
FIG. 10A is a view illustrating an insulating paper slot liner for a conventional distributed winding motor.

First, a method of inserting a coil conductor into a conventional stator core will be described in order to clearly understand a method of assembling a coil having a distributed winding structure with respect to the stator core of the present embodiment. FIG. 10A is a perspective view illustrating a conventional insulating paper 19 installed in a slot of the stator core. Conventionally, for example, the insulating paper 19 made of aramid such as Nomex (registered trademark) is folded like a valley at intervals to form a slot liner having a B-shaped cross section, and a plurality of the slot liners are arranged in the slots of the stator core as illustrated in FIG. 10A. A coil having a distributed winding structure can be formed by inserting a hairpin-shaped (U-shaped) coil conductor into such a slot liner.

Figure 10B:
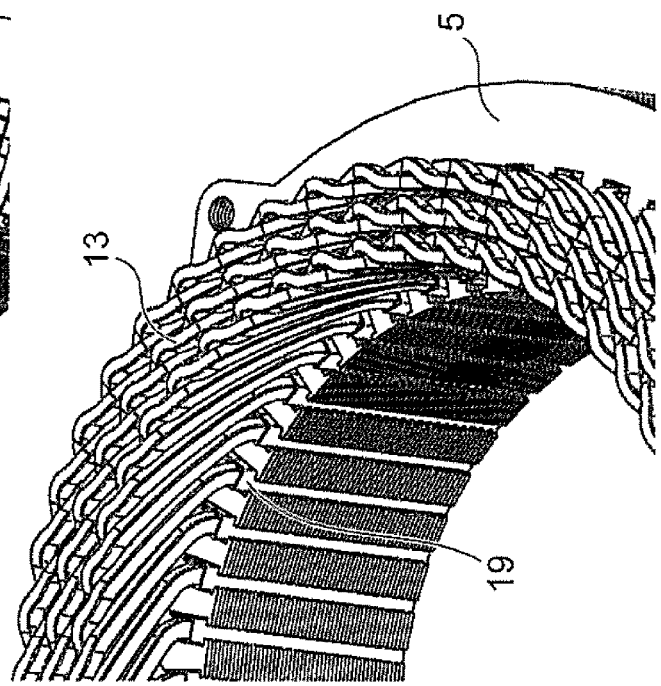
FIG. 10B is a perspective view illustrating a state where an insulating paper is inserted into a slot and a coil conductor is inserted.

FIG. 10B is a perspective view illustrating a state where the insulating paper 19 and the coil conductor 13 are inserted into the slots 53 of the stator core 5. As illustrated in FIG. 10B, a state where three insulating papers 19 as slot liners are radially arranged in the slots 53 and three coil conductors 13 are inserted is illustrated. The coil conductor 13 has a hairpin shape, and a slot into which one leg is inserted is separated from a slot into which the other leg is inserted. When 48 slots and teeth are provided, one slot angle is 7.5 degrees and an opening angle of the coil conductor 13 is 45 degrees. As a result, the other leg is inserted into the slot that is six slots ahead of the slot into which the one leg is inserted, in the coil conductor 13.

Figure 10C:
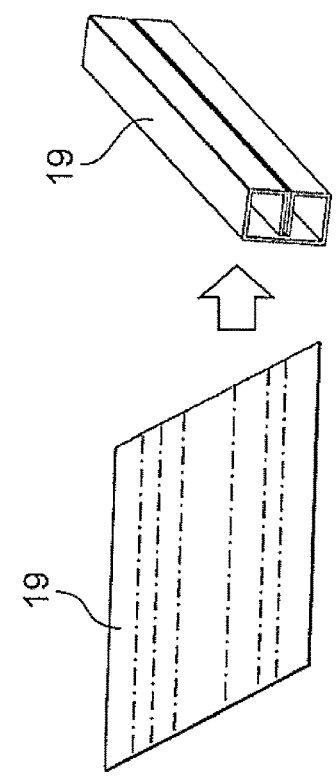
FIG. 10C is a top view of FIG. 10B.

FIG. 10C is an axial top view illustrating the arrangement of the coil conductors 13. FIG. 10C illustrates only the first quadrant. The slots 53 are provided at a pitch of 7.5 degrees, and numbers of the slots 53 in the first quadrant are numbered one to twelve in order from a position at an angle of 0 degree. Further, numbers of insertion holes (through-holes 31) of the coil conductors 13 in one slot 53 are set to the first to sixth layers in order from the radially inner side. In the coil conductor 13 located on the innermost side in the radial direction, a right leg is arranged in the first layer of the fifth slot, and a left leg is arranged in the second layer of the eleventh slot. Similarly, in the radially second coil conductor 13, a right leg is arranged in the third layer of the fifth slot, and a left leg is arranged in the fourth layer of the eleventh slot. Similarly, in the coil conductor 13 on the outermost side in the radial direction, a right leg is arranged in the fifth layer of the fifth slot, and a left leg is arranged in the sixth layer of the eleventh slot.

Although not illustrated, the coil conductor 13 is arranged on the axially opposite side of the stator core 5 such that a shape after the connection of the coil is wavy as a whole. As apparent from FIGS. 10B and 10C, it can be understood that it is difficult to insert the coil conductors 13 into the adjacent slots in a state where only one hairpin-shaped coil conductor 13 is inserted. Specifically, it can be understood that the insertion hole is blocked by the coil conductor 13 of the fifth slot, which has been already inserted, when the coil conductor 13 is to be inserted in the first layer of the sixth slot, for example, in the state illustrated in FIG. 10C, so that it is difficult to insert the coil conductor 13. It can be said that the coil conductor can be barely inserted in the first layer or the like of the ninth or subsequent slot. Therefore, it can be understood that it is necessary to insert the coil conductors in the circumferential direction in parallel with each other after forming the entirely combined state in order to insert the wave-wound coil conductor into the slot 53.

Figure 10D:
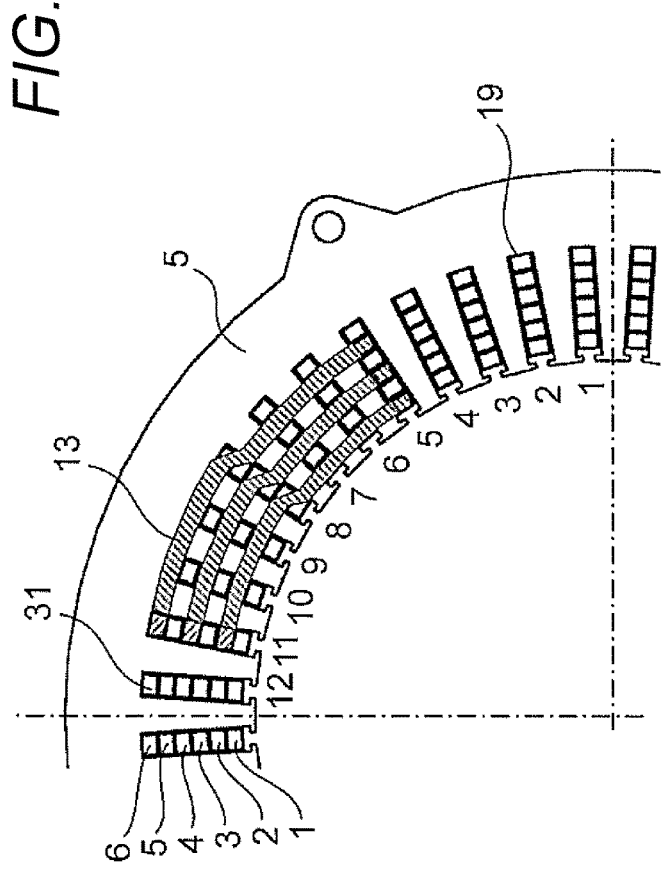
FIG. 10D is a perspective view illustrating a state where all the coil conductors are assembled.

FIG. 10D is a perspective view illustrating a stator in which the coil conductors 13 are inserted in all the slots 53. As illustrated in FIG. 10D, the coil conductors 13 are arranged so as to overlap each other.

In the method using the insulating paper 19 illustrated in FIGS. 10A to 10D, since the insulating paper 19 between the coil conductors 13 and the insulating paper 19 between the coil conductor 13 and the stator core 5 are doubled, the thickness increases, which reduces the space factor of the coil and also reduces the thermal conductivity from the coil conductor 13 to the stator core 5.

Further, since it is difficult to fix the insulating paper 19 in the axial direction, a positional displacement in the axial direction or breakage of the paper occurs when the coil conductor 13 is inserted, which causes a manufacturing defect of the motor.

FIG. 11A is a perspective view for describing a conventional coil bobbin for a concentrated winding motor. The left side of FIG. 11A illustrates a state where the coil bobbin 10 for the concentrated winding structure is attached to the teeth core 55 of the I-shaped split core, and the right side thereof illustrates a state where a coil 14 is wound around the coil bobbin 10. As illustrated in FIG. 11A, since the coil 14 is wound around the single teeth core 55 in the case of the concentrated winding structure, the coil bobbin 10 has a substantially H shape when viewed in the axial direction. In this case, the coil 14 is wound in an open state, and the coating of the coil 14 has no portion where enamel is exposed, and thus, it is unnecessary to insulate the coils 14 one by one.

However, the coil bobbin 10 can hold the teeth core 55, but it is difficult to hold the coils 14 one by one, so that the positional accuracy of the coils 14 is likely to vary.

FIG. 11B is a perspective view illustrating a state where a stator having a concentrated winding structure is assembled. As illustrated in FIG. 11B, the coil 14 is wound in advance around the coil bobbin 10, attached to the teeth core 55, and then, the resultant is fit with the back yoke 56, thereby assembling the stator having the concentrated winding structure.

Coil Insertion Method of Present Embodiment

Next, a method of inserting a coil conductor into a stator core to which the coil bobbin 1 of the present embodiment has been attached will be described. In the example illustrated hereinafter, segment conductors obtained by splitting a coil conductor having a distributed winding structure in the axial direction are adopted. Although details will be described later, the segment conductors are inserted into the through-holes 31 of the coil bobbins 1 from both sides in the axial direction, and the segment conductors are connected to each other inside the through-hole 31, thereby assembling a stator coil. Incidentally, the method of assembling the stator coil having the distributed winding structure using the coil bobbin 1 of the present embodiment is not limited to the method to be described below, and any method can be adopted.

FIG. 12A is a perspective view illustrating a state before segment conductors 13a and 13b are inserted into slots. As illustrated in FIG. 12A, the segment conductor 13a (first segment conductor) and the segment conductor 13b (second segment conductor) are hairpin-shaped (U-shaped) having two legs. A distal end portion of the segment conductor 13a has a convex shape, and a distal end portion of the segment conductor 13b has a concave shape. The segment conductors 13a and 13b are inserted into the slots from opposite sides in the axial direction. The segment conductor 13a and the segment conductor 13b are connected in the through-hole of the coil bobbin 1 in the axial direction so as to form a wave winding.

FIG. 12B is an enlarged perspective view of the vicinity of a connection portion between the segment conductor 13a and the segment conductor 13b. The left side of FIG. 12B illustrates a state before connection, and the right side thereof illustrates a state after connection.

The connection portion between the segment conductor 13a and the segment conductor 13b is formed such that the convex shape and the concave shape are meshed with each other in substantially the same shape, and has a shape in which a plane parallel to the axial direction is larger than the cross-sectional area of the segment conductor. As a result, the contact and connection can be performed on the plane parallel to the axial direction. As the connection portion of the segment conductors 13a and 13b has the structure illustrated in FIG. 12B, stress can be applied uniformly to the entire segment conductors 13a and 13b in parallel with the axial direction, and thus, firm and stable connection can be achieved.

Even if it is difficult to connect the segment conductors 13a and 13b at the same axial place in all of the plurality of coil conductors, such as a case where axial lengths of multiple coil conductors arranged in the circumferential and radial directions are different, the contact can be achieved by applying stress in the axial direction, and thus, it is possible to suppress a manufacturing error or an assembly error.

Incidentally, the shape of the connection portion between the segment conductors 13a and 13b is not limited to the convex shape and the concave shape illustrated in FIG. 12B, and may be a V-shape in which surfaces oblique to the axial direction come into contact with each other.

FIG. 12C is a view for describing a method of inserting the segment conductors 13a and 13b into the coil bobbin 1. As illustrated in FIG. 12C, a right leg of the segment conductor 13a and a left leg of the segment conductor 13b are inserted into the through-hole 31 of the first layer of the coil bobbin 1 in the axial direction. In this manner, the left leg of the segment conductor 13a and the right leg of the segment conductor 13b are located on the opposite sides in the circumferential direction, and the wavy coil is formed when the segment conductors 13a and 113b are connected.

A dimension of the through-hole 31 is substantially equal to a rectangular outer dimension of the segment conductors 13a and 13b. As a result, the segment conductors 13a and 13b can be inserted and connected in parallel to the axial direction, so that the coil can be assembled with high positional accuracy, and the highly reliable connection can be achieved. Further, the space factor of the segment conductors 13a and 13b with respect to the slot can be increased.

Since a portion where enamel of a rectangular wire is peeled off is exposed in the connection portion between the segment conductors 13a and 13b, and thus, it is necessary to secure a sufficient insulation distance (space distance or creepage distance) from the teeth core 55 of the stator core. Therefore, a portion where each coil conductor is arranged needs to be covered with an insulator. On the other hand, when the coil bobbin 1 of the present embodiment is used, the insulation distance between the segment conductors 13a and 13b and the teeth core 55 can be secured, and the short circuit can be prevented. Further, it is unnecessary to weld the coil ends by forming the shape having the segment conductors 13a and 13b, and thus, the resistance value can be reduced.

The structure of the coil as illustrated in FIGS. 12A to 12C is described in Japanese patent application No. 2018-134662. The content disclosed in that patent application is incorporated as part of the present specification.

In this manner, the coil bobbin 1 of the present embodiment has the through-hole 31 extending in the axial direction, and thus, is particularly suitable for a method of assembling split coils in which application of stress in the axial direction is essential for assembly. The method of assembling the coil according to the present embodiment has significantly little influence on an insulating member or the stator core as compared with conventional hairpin coil insertion, non-insertion side bending, and welding method. Since the stator core is sensitive to stress and an iron loss sometimes increase, the method of the present embodiment can be superior to high-grade electromagnetic steel sheets and low-loss materials such as amorphous. Further, it is effective in preventing damage to the coil or the insulator during the coil insertion, coil deformation, and the like, the number of required coils can be reduced, and the required assembly jigs or equipment investment can be reduced. Further, the assembly process can be simplified, and thus, an effect of reducing the cost of the motor can be expected.

Configuration of Distributed Winding Radial Gap-Type Motor

Next, a distributed winding radial gap-type motor having a stator to which the coil bobbin 1 of the present embodiment has been applied will be described. The stator having the distributed winding structure in which the segment conductors 13a and 13b illustrated in FIGS. 12A to 12C are assembled is used for the motor of the present embodiment.

FIG. 13A is a perspective view illustrating a rotor 400 and a stator 500. As illustrated in FIG. 13A, the rotor 400 is configured by fixing the rotating rotor core 11 to a shaft 37. In the present embodiment, a permanent magnet synchronous motor is illustrated as an example, and the permanent magnet 12 is arranged inside or on the surface of the rotor core 11. The rotor 400 is arranged inside the stator 500, and the surface of the rotor 400 and the inner surface of the stator 500 oppose each other through a gap to operate as a motor by exchanging magnetic fluxes. Incidentally, the rotor may be a basket-type conductor rotor of an induction motor or a magnetic salient-pole rotor of a reluctance motor.

The stator 500 includes the stator core 5, the segment conductors 13a and 13b, and resin-molded ring portions 303a and 303b. With the segment conductor 13a aligned in the state of being inserted in the circumferential direction, a portion including an apex of the coil end is molded by the resin-molded ring portion 303a. As a result, the resin-molded ring portion 303a and a coil group of the segment conductor 13a are integrated.

As a part of the coil end of the hairpin coil group is fixed, the coil group can be stably handled without using a large jig. The hairpin coil group integrated by the resin-molded ring portion 303a is inserted into the through-holes of the coil bobbins (not illustrated in FIGS. 13A and 13B) of the present embodiment attached to the teeth of the stator core 5.

Meanwhile, similarly, a portion including an apex of the coil end is molded by the resin-molded ring portion 303b in a coil group of the segment conductor 13b on the axially opposite side. As a result, the resin-molded ring portion 303b and the coil group of the segment conductor 13b are integrated. The coil group integrated by the resin-molded ring portion 303b is inserted into the through-holes of the coil bobbins (not illustrated in FIGS. 13A and 13B) attached to the teeth of the stator core 5. Then, the segment conductors 13a and 13b are connected by being further pushed to a predetermined position by a pressing device such as a press.

FIG. 13B is a cross-sectional view illustrating a structure in which a motor 300 is assembled. As illustrated in FIG. 13B, the motor 300 includes the rotor 400, the stator 500, an output-side bearing holding portion 301, a counter-output-side bearing holding portion 302, ball bearings 304 and 305, bolts 306 and 307, and a housing 308.

The ball bearing 304 comes into contact with an output side of a shaft 401 of the rotor 400, and the ball bearing 305 comes into contact with a counter-output side. Inner peripheral surfaces of the ball bearings 304 and 305 are held to be rotatably together with the shaft 401 in a state where outer circumferences of the ball bearings 304 and 305 are fixed.

The outer circumference of the ball bearing 304 is held by the output-side bearing holding portion 301. The outer circumference of the ball bearing 305 is held by the counter-output-side bearing holding portion 302. The output-side bearing holding portion 301 and the counter-output-side bearing holding portion 302 are held by tightening the bolts 306 and 307 by applying stress to the housing 308 in the axial direction, thereby maintaining the coaxiality.

The resin-molded ring portions 303a and 303b come into contact with axial inner surfaces of the output-side bearing holding portion 301 and the counter-output-side bearing holding portion 302, respectively, and are held in the state of receiving the stress in the axial direction. As a result, even when the rotor 400 vibrates due to torque pulsation or load fluctuation and the stator 500 receives vibration or stress, the housing 308 can prevent the segment conductors 13a and 13b from coming off.

With the structure illustrated in FIG. 13B, heat generated by Joule loss generated in the segment conductors 13a and 13b can be conducted from the coil end to the output-side bearing holding portion 301 and the counter-output-side bearing holding portion 302 for cooling. Further, in general, a cooling method of applying cooling oil (lubricating oil) is often adopted for the coil end, which is not resin-molded, and the cooling oil can be directly applied to the coil end that is not surrounded by resin, and thus, the oil cooling effect is not reduced.

SUMMARY

As described above, the teeth holding portion 2 and the slot insulator 3 are integrally formed in the coil bobbin 1 of the present embodiment, and the teeth can be firmly held by the single part. The slot insulator 3 has a plurality of through-holes into which each coil conductor can be inserted in the axial direction. As a result, the coil can be completely fixed by keeping the coil firmly held in the axial direction, and thus, it is unnecessary to provide a step of performing a varnish treatment (fixing the coil using the resin), conventionally required to fix the coil, and thus, manufacturing steps of the motor can be shortened. The varnish treatment requires a drying furnace (usually a continuous furnace) for drying the varnish, which leads to reduction in investment cost of such a drying furnace and cost such as the amount of heat (electricity cost) during manufacturing.

Further, the coil bobbin 1 of the present embodiment can hold the coil conductors while insulating the coil conductors from each other, and thus, it is possible to secure both the creepage distance and the insulation distance.

Modifications

The present disclosure is not limited to the above-described embodiments and includes various modifications. For example, the above-described embodiments have been described in detail in order to describe the present disclosure in an easily understandable manner, and do not necessarily include the entire configuration that has been described above. Further, a part of a certain embodiment can be replaced with the configuration of another embodiment. Further, the configuration of one embodiment can be also added with the configuration of another embodiment. Further, a part of the configuration of each of the embodiments may be deleted or added or replaced with a part of the configuration of another embodiment.

What is claimed is:

1. A coil bobbin attached to a stator core of a distributed winding radial gap-type rotating electric machine,
    the coil bobbin comprising a teeth holding portion and a slot insulator which are made of an insulator,
    wherein the teeth holding portion has: a first wall surface that covers a first circumferential side surface of a tooth of the stator core; a second wall surface that covers at least a part of a second circumferential side surface of the tooth; and a third wall surface that covers both side surfaces in an axial direction of the tooth, and
    the slot insulator is formed integrally with the first wall surface of the teeth holding portion, and has a plurality of through-holes extending in the axial direction and arrayed in a radial direction.

2. The coil bobbin according to claim 1, wherein the second wall surface covers only both radial end portions of the second circumferential side surface of the tooth.

3. The coil bobbin according to claim 1, wherein the slot insulator is capable of being assembled with the second wall surface of the coil bobbin adjacent to the slot insulator such that an insulation thickness becomes constant when a plurality of the coil bobbins are assembled.

4. The coil bobbin according to claim 1, wherein the second wall surface entirely covers the second circumferential side surface of the tooth.

5. The coil bobbin according to claim 1, wherein the slot insulator has:
    a fourth wall surface opposing the first wall surface; and
    a plurality of partition walls that divides the first wall surface and the fourth wall surface, and
    the plurality of through-holes are defined by the first wall surface, the fourth wall surface, and the plurality of partition walls.

6. The coil bobbin according to claim 5, wherein a thickness of the fourth wall surface and each thickness of the plurality of partition walls are each 0.2 mm to 0.4 mm.

7. The coil bobbin according to claim 1, wherein each of the plurality of through-holes has a size into which a coil conductor is insertable.

8. The coil bobbin according to claim 1, wherein a thickness of the first wall surface, a thickness of the second wall surface, and a thickness of the third wall surface are each 0.2 mm to 0.4 mm.

9. A stator core of a distributed winding radial gap-type rotating electric machine comprising:
    an annular core back;
    a tooth protruding inward in a radial direction from the core back; and
    the coil bobbin according to claim 1 which is attached to the tooth.

10. The stator core according to claim 9 being an integral stator core in which the core back and the tooth are integrated.

11. The stator core according to claim 9 having a T-shaped split structure split in a circumferential direction.

12. The stator core according to claim 9 having an I-type split structure split into a teeth core forming the tooth and a back yoke forming the core back,
    wherein the back yoke has an annular shape and has a recess provided along an inner circumference, and
    the teeth core is inserted into the recess from an inner side to an outer side in the radial direction.

13. The stator core according to claim 12, further comprising
    a resin molded body that has a columnar portion filling a gap between an inner peripheral surface of the back yoke and the teeth core, and a collar portion straddling axial side surfaces of the teeth core and the back yoke, and bonds the teeth core and the back yoke.

14. The stator core according to claim 12, wherein the teeth core is made of a soft magnetic material.

15. The stator core according to claim 9, wherein the coil bobbin and the tooth are bonded to each other.

16. A distributed winding radial gap-type rotating electric machine comprising:
    the stator core according to claim 9; and
    a coil conductor distributedly wound around the stator core.

17. The distributed winding radial gap-type rotating electric machine according to claim 16, wherein
    the coil conductor includes a first segment conductor and a second segment conductor each having a U shape,
    the first segment conductor is inserted into the through-hole of the coil bobbin from one side in the axial direction,
    the second segment conductor is inserted into the through-hole of the coil bobbin from another side in the axial direction, and
    the first segment conductor and the second segment conductor are connected inside the through-hole.

18. The distributed winding radial gap-type rotating electric machine according to claim 17, wherein
the first segment conductor has a convex shape at a distal end portion,
the second segment conductor has a concave shape at a distal end portion, and
the convex shape and the concave shape have a combined surface whose contact surface is a surface perpendicular to the axial direction.

* * * * *